United States Patent
Agardh et al.

(10) Patent No.: US 9,497,663 B2
(45) Date of Patent: Nov. 15, 2016

(54) COORDINATED PRIORITY SCHEME FOR SMALL DATA PACKET TRANSMISSION

(71) Applicant: Sony Corporation, Tokyo (JP)

(72) Inventors: Kåre Agardh, Lund (SE); Bo Larsson, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 95 days.

(21) Appl. No.: 14/228,931

(22) Filed: Mar. 28, 2014

(65) Prior Publication Data
US 2015/0282004 A1 Oct. 1, 2015

(51) Int. Cl.
| | |
|---|---|
| H04W 28/04 | (2009.01) |
| H04W 72/04 | (2009.01) |
| H04W 28/06 | (2009.01) |
| H04W 74/00 | (2009.01) |

(52) U.S. Cl.
CPC ......... *H04W 28/06* (2013.01); *H04W 72/0446* (2013.01); *H04W 74/002* (2013.01)

(58) Field of Classification Search
None
See application file for complete search history.

(56) References Cited

U.S. PATENT DOCUMENTS

| | | | | |
|---|---|---|---|---|
| 8,483,105 B2* | 7/2013 | Nanda | ............... | H04L 29/06068 370/278 |
| 2009/0154436 A1* | 6/2009 | Choi | ................. | H04W 72/1242 370/338 |
| 2013/0077554 A1* | 3/2013 | Gauvreau | ............... | H04L 5/001 370/312 |
| 2013/0121221 A1 | 5/2013 | Homchaudhuri et al. | | |
| 2013/0208708 A1 | 8/2013 | Nezou et al. | | |
| 2013/0235773 A1 | 9/2013 | Wang et al. | | |
| 2013/0336184 A1* | 12/2013 | Kwon | ................. | H04W 74/002 370/311 |
| 2015/0003377 A1* | 1/2015 | Wu | ..................... | H04W 72/121 370/329 |
| 2015/0103767 A1* | 4/2015 | Kim | .................. | H04W 52/0216 370/329 |

FOREIGN PATENT DOCUMENTS

WO 2013123906 A1 8/2013

OTHER PUBLICATIONS

International Search Report and Written Opinion; May 29, 2015; issued in International Patent Application No. PCT/EP2015/054007.

* cited by examiner

*Primary Examiner* — Robert C Scheibel
(74) *Attorney, Agent, or Firm* — James C. Edwards; Moore & Van Allen PLLC

(57) ABSTRACT

The invention is directed to transmitting a data packet from a first station to an access point or another station. An exemplary method comprises receiving, at a first station, a beacon from the access point or another station; receiving, at the first station, information associated with an opportunity window from the access point or another station; and transmitting, during the opportunity window, a data packet from the first station to the access point or another station.

16 Claims, 3 Drawing Sheets

COORDINATED PRIORITY SCHEME FOR SMALL DATA PACKET TRANSMISSION

BACKGROUND

Today's communication networks are becoming more and more inefficient. One reason for this growing inefficiency is that networks are designed to carry large data packets, despite a very large share of the network traffic comprising small data packets. As used herein, a large data packet is a data packet that has a size equal to or greater than approximately 1500 bytes. As used herein, a small data packet is a data packet that has a size less than approximately 1500 bytes. For example, a small data packet has a size of 100 bytes. Numerous measurements and statistics from wireless and wired networks indicate that a big share of all data packets flowing through today's communication networks are small data packets. Data packets sized up to 100 bytes represent around 20% of total amount of data packets on networks; however, they transfer only 2-5% of the total data volume on networks.

Today's communication networks are optimized to carry large data packets (e.g., 1500 byte data packets) or aggregates of large data packets (e.g., 8×1500 byte data packets). However, since a lot of the data volume flowing through communication networks today comprise small data packets, which have a large overhead (e.g., preamble sequences, frame headers, acknowledge packets, etc., which consume bandwidth unnecessarily), communication networks are inefficient. There is a need to address these inefficiencies associated with communication networks.

BRIEF SUMMARY

Embodiments of the invention are directed to a system, method, and computer program product for transmitting a data packet from a first station to an access point or another station. An exemplary method comprises: receiving, at a first station, a beacon from the access point or another station; receiving, at the first station, information associated with an opportunity window from the access point or another station; and transmitting, during the opportunity window, a data packet from the first station to the access point or another station.

In some embodiments, the data packet comprises a small data packet.

In some embodiments, the data packet comprises a large data packet.

In some embodiments, the network comprises a wireless local area network.

In some embodiments, the beacon is received once during a delivery traffic indication message (DTIM) interval.

In some embodiments, the data packet is transmitted on a radio frequency (RF) channel.

In some embodiments, the opportunity window is associated with an interframe spacing (IFS) parameter.

In some embodiments, a duration of the opportunity window is based on a size of the data packet.

In some embodiments, a second station does not receive information associated with the opportunity window of the first station.

In some embodiments, a second station receives information associated with the opportunity window of the first station, and the second station does not send a data packet to the access point or another station during the opportunity window of the first station. Therefore, the invention enables the second station to save power associated with an attempted data transmission during the opportunity window of the first station.

In some embodiments, the method further comprises at least one of requesting the opportunity window from the access point or another station or informing the access point or another station that the first station no longer needs the opportunity window.

In some embodiments, the method further comprises transmitting, during the same opportunity window, a second data packet from a second station to the access point or another station.

In some embodiments, the method further comprises prior to transmitting during the opportunity window, determining if a second station is transmitting a second data packet to the access point or another station.

In some embodiments, the access point or another station allocates at least one opportunity window after a specific number of beacons.

In some embodiments, the beacon comprises a sequence indicator.

In some embodiments, a first station is provided for transmitting a data packet to an access point or another station. The first station comprises: a memory; a processor; a module stored in the memory, executable by the processor, and configured to: receive, at a first station, a beacon from the access point or another station; receive, at the first station, information associated with an opportunity window from the access point or another station; and transmit, during the opportunity window, a data packet from the first station to the access point or another station.

In some embodiments, a computer program product is provided for transmitting a data packet from a first station to an access point or another station. The computer program product comprises a non-transitory computer-readable medium comprising code configured to: receive, at a first station, a beacon from the access point or another station; receive, at the first station, information associated with an opportunity window from the access point or another station; and transmit, during the opportunity window, a data packet from the first station to the access point or another station.

BRIEF DESCRIPTION OF THE DRAWINGS

Figure 1:
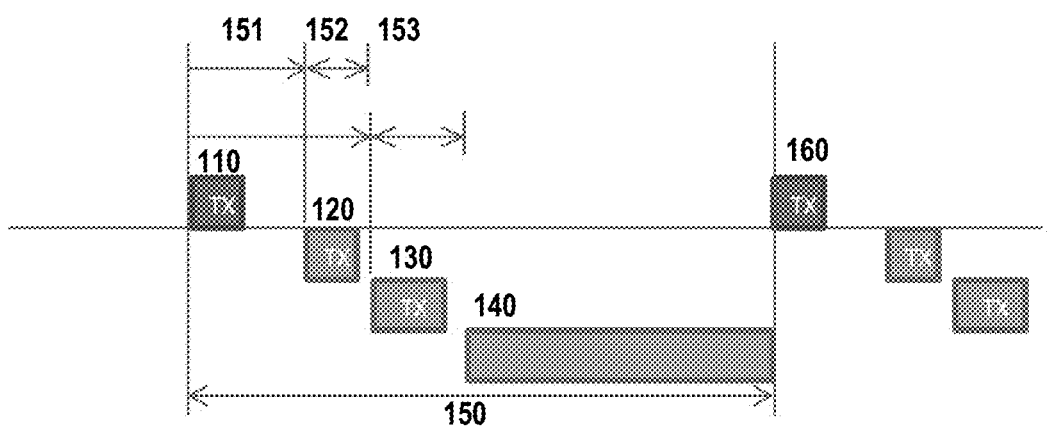
Figure 2:
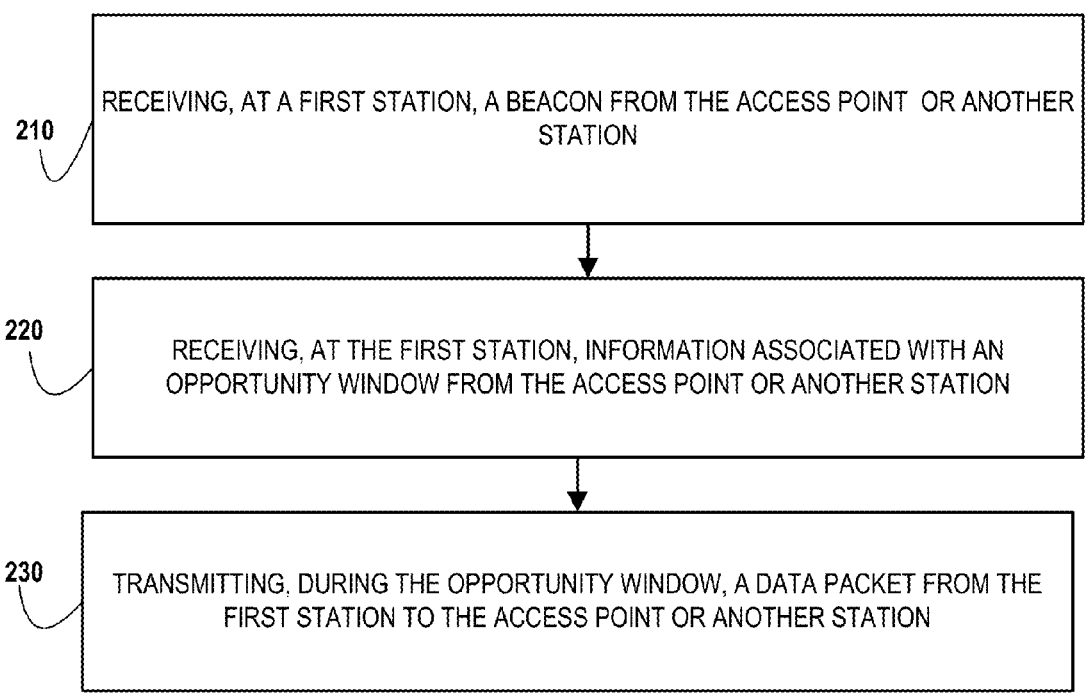
Figure 3:
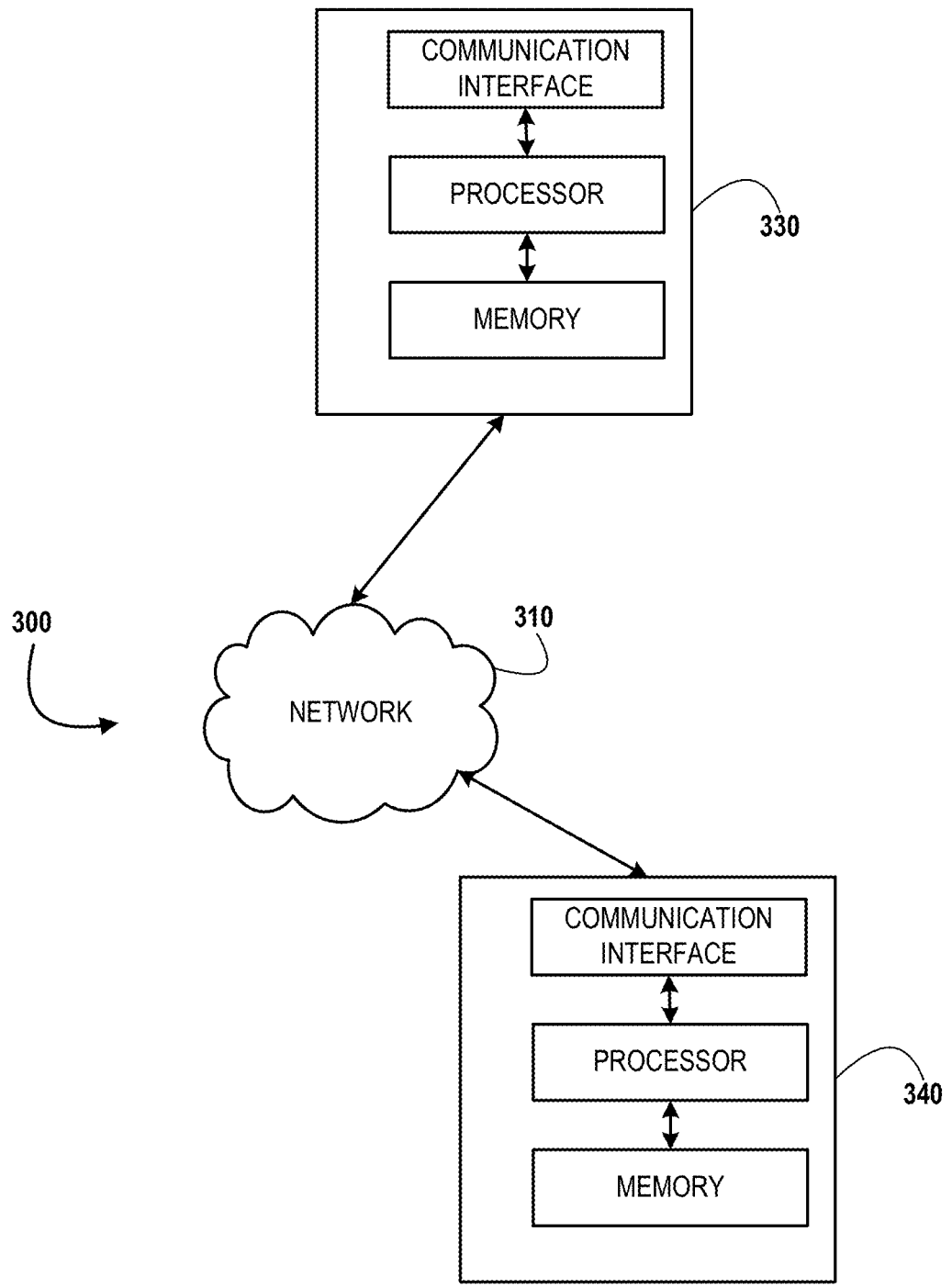

Having thus described embodiments of the invention in general terms, reference will now be made to the accompanying drawings, where:

FIG. 1 presents an exemplary block diagram for transmitting data packets to an access point or another station from a station connected to the access point or another station, in accordance with embodiments of the present invention;

FIG. 2 presents an exemplary process flow for transmitting data packets to an access point or another station from a station connected to the access point or another station, in accordance with embodiments of the present invention; and FIG. 3 presents an exemplary network environment for transmitting data packets to an access point or another station from a station connected to the access point or another station, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Communication network efficiencies in the routing of small data packets need to be improved. The present invention is directed to implementing semi-coordination of communication networks. The present invention provides a coordinated adaptive opportunity window for transmission in networks. As used herein, a communication network or "network" may be a wired or wireless network. For example, the network may be a wireless local area network (WLAN). As used herein, the terms "data" and "data packet" may be used interchangeably.

A network may be based on one or more network topologies. In an infrastructure topology, a network comprises a central device (an "access point" or "AP") and one or more connected devices ("stations" or "STAs") that communicate with other connected devices via the AP. In other embodiments, the network may be based on other network topologies, such as a peer-to-peer ("P2P") topology or a mesh network topology. This invention is not limited to any particular network topologies. For this reason, it should be appreciated that any device, element, feature, method or process described anywhere in this specification with respect to an access point ("AP") may be associated with or performed by another station (e.g., a station other than the first station). For example, where the specification describes a transmission between an STA and the AP, such description would also be equally applicable to (and is intended to describe) a transmission between a first STA and a second STA also in the same context and using the same method and process. Thus, anywhere an AP is referenced, such reference may be replaced with a second STA (or "another STA" or "another station") throughout this specification.

An AP transmits beacons with defined intervals on the order of 100-300 ms. A defined interval may also be referred to as a delivery traffic indication message ("DTIM") interval. A certain period after the beacon is transmitted from the AP to each connected STA, each connected STA may start a transmission to the AP on a radio frequency ("RF") channel or through a wired channel by first sensing or determining if another STA is transmitting on the same RF channel and/or if the AP is transmitting on the same RF channel or wired channel. As used herein, a beacon may also be referred to as a beacon frame and indicates the presence of the AP to connected STAs. The certain period may be determined based on an interframe spacing ("IFS") (e.g., distributed IFS ("DIFS") of 25 µs), which is defined below. If the channel is silent, transmission from the STA to the AP can commence. If the channel is busy, a backoff procedure is initiated such that the STA "backs off" from transmitting a data packet to the AP now, and the STA retries the transmission at a subsequent time.

There is a defined minimum time spacing that is allowed between data packet transmissions associated with different STAs on a channel and the AP. This defined minimum time spacing may be referred to as interframe spacing (IFS). Examples of IFS implementations include reduced IFS ("RIFS"), short IFS ("SIFS"), arbitration IFS ("AIFS"), DIFS, etc. When a STA wants to send small data packets to the AP, the IFS, in combination with carrier sense multiple access ("CSMA") procedures in WLAN, leads to inefficiencies in the network. CSMA is a protocol in which a node or STA verifies absence of traffic before transmitting on the channel connecting the STA and the AP.

In the present invention, the AP allocates an opportunity window for one or more of the connected STAs. In this opportunity window, the STA is allowed to use a very short IFS (e.g., slightly greater than 0 µs). Therefore, the STA gets priority during the opportunity window and can send its data to the AP more efficiently during the opportunity window. While the AP may inform the other STAs of the opportunity window of that STA or another STA, as explained below, generally speaking, the other STAs need not to be informed of the STA's transmission during the opportunity window since they use sensing and collision avoidance procedures to avoid transmitting to the AP during the STA's opportunity window.

The AP inspects data traffic and monitors actual traffic characteristics from all STAs connected to the AP in order to select the timing (e.g., time and duration of opportunity window) for each STA's opportunity window. For example, the AP identifies a STA transmitting 64 byte data packets, and allocates a suitable time slot (e.g., what time) and suitable time period (e.g., how long) for the STA based on the size of the transmitted data packets, and informs the STA about the time slot. Therefore, the present invention provides a protocol between the AP and STAs for the AP to inform the STAs when the STAs have received an allocation of a certain time slot for transmitting data packets to the AP. The protocol described herein is added to WLAN management traffic protocol associated with the network.

This protocol may also be used for a STA to request a slot when it realizes it has a periodic need of small data transfers. For example, the STA may be a low-power device that sends data infrequently (e.g., the STA requests a slot every 10 seconds) to the AP. As a further example, the STA may be a streaming device (e.g., a video streaming device) with a certain bitrate that sends periodic data packets (e.g., acknowledgement ("ACK") packets) to the AP. Also, the protocol enables a STA to inform the AP that a slot is no longer needed when the STA determines that it no longer has a need for small data transfers to the AP.

In some embodiments, information may be included in beacon transmissions (e.g., all beacon transmissions) from the AP to all STAs connected to the AP about allocated opportunity windows in order to lower power consumption, since all STAs will then know when the channel to the AP is busy and that there is no need for them to try to access the channel (e.g., via CSMA) during the period when the channel is busy. As used herein, a beacon is a data packet sent by the AP to one or more STAs.

The opportunity window is defined as a time offset in relation to the time associated with the AP's beacon transmission to the connected STAs. Each STA, having received an opportunity window definition from the AP, may use that window to transmit data to the AP. The definition may also include a duration value to ensure that one STA has completed transmission during the opportunity window before the next STA has its opportunity to commence transmission during the opportunity window. There may also be a time gap after the completion of the transmission of a first STA during an opportunity window and before the commencement of the transmission of a second STA during the opportunity window. The opportunity window starts after the beacon has been sent from the AP to the connected STAs and after a defined time period (approximately 5 µs) allowing the AP to switch from transmission ("TX") mode to reception ("RX") mode. In some embodiments, the minimum IFS (e.g., SIFS) for each connected STA is 16 µs. This means a second STA must wait at least 16 µs to transmit a data packet to the AP after the transmission of a data packet from a first STA to the AP. Waiting for 16 µs enables the AP to prepare for the reception of the data packet from the second STA. In some embodiments, the second STA transmits its data packet to the AP during a different opportunity window from the opportunity window during which the first STA transmits its data packet to the AP. In other embodiments, the second STA and the first STA transmit their data packets to the AP during the same opportunity window, but at different times during the same opportunity window.

The maximum duration or size of an opportunity window associated with a single STA may be set to one (1) OFDM (as defined below) symbol time (3.2 µs), which enables transmission, during the opportunity window, of a maximum data packet size of approximately 200 bytes for 802.11n networks and 100 bytes for 802.11g networks. OFDM refers to orthogonal frequency-division multiplexing, which is a method of encoding data packets. An opportunity window of this duration or size is sufficient for many use cases (e.g., transmission control protocol ("TCP") acknowledgement ("ACK") data for streaming media data packet transmission, sensor data packet transmission, etc.). The present invention enables at least two or three STAs to be allocated opportunity windows during a DTIM interval assuming an IFS (e.g., SIFS) of 16 µs.

In order to improve power efficiency and allow for low tolerance clocking solutions for low duty cycle or low data rate STAs that require allocation of an opportunity window infrequently (e.g., every 1 out of 100 beacons), the present invention can include adding sequence indicators or numbers to each beacon transmission from the AP. Hence, an opportunity window allocation from the AP to a low data rate STA may be "T=500 µs, SQN_INTERVAL=100." Here, T is the duration of the opportunity window and SQN_INTERVAL is the sequence number.

Therefore, the present invention causes a reduction in overhead for small data packets being transmitting from a STA to an AP, wherein the overhead stems from: transmissions that consume bandwidth unnecessarily, (e.g., backoff intervals associated with determining a transmission channel is busy and "backing off" transmission until the channel is free), as well as required delays associated with transmission, and guard intervals associated with ensuring that distinct transmissions from a single or distinct STAs do not interfere with each other. As used herein, transmission overhead associated with a data packet transmitted from a STA to an AP includes preamble sequences, frame headers, acknowledge packets, etc. The overhead is one of the key reasons for the low efficiency associated with transmission of small data packets in networks, and the present invention is directed to addressing this inefficiency.

Referring now to FIG. 1, FIG. 1 describes an exemplary block diagram for transmitting data packets to an access point or another station from a station connected to the access point or another station. Block 110 illustrates a beacon transmission from an AP to STAs connected to the AP. Block 151 illustrates a time period for the beacon transmission. As indicated by block 151, the period allocated for the beacon transmission is longer than the duration of time that it takes to transmit the beacon to the connected STAs. Block 120 illustrates a data packet transmission (e.g., a small data packet transmission) from a first STA to the AP. Block 152 illustrates a duration of the opportunity window for the first STA. As indicated by block 152, the duration of the opportunity window for the first STA is longer than the duration of time 120 that it takes to transmit the data packet from the first STA to the AP. Block 130 illustrates a data packet transmission (e.g., a small data packet transmission) from a second STA to the AP. Block 153 illustrates a duration of the opportunity window for the second STA. As indicated by block 153, the duration of the opportunity window for the second STA is longer than the duration of time 130 that it takes to transmit the data packet from the second STA to the AP. Block 140 illustrates data packet transmissions from other STAs to the AP. FIG. 1 also illustrates that the duration of the DTIM interval includes the allocated time periods associated with the beacon transmission, the opportunity windows for the first and second STAs, and the remaining duration allocated for other STAs (e.g., STAs other than the first and second STAs that receive the beacon from the AP). In some embodiments, the other STAs are aware about the existence of and the duration of the opportunity windows allocated to the first and second STAs. In other embodiments, the other STAs are not aware about the existence of and the duration of the opportunity windows allocated to the first and second STAs. Block 160 illustrates a beacon transmission from an AP to STAs connected to the AP for a subsequent DTIM interval.

As explained previously, each STA has an allocated opportunity window. The duration or size of the opportunity window is defined by the data that the STA sends to the AP. In some embodiments, the STA informs the AP about the amount of data that it intends to send to the AP prior to sending the data to the AP. In other embodiments, the AP measures the amount of data sent by the STA and keeps a history of previous data transfers from the STA and/or measures historic or current data traffic associated with the STA, and sets a duration or size for the opportunity window based on the data transfer history associated with the STA and/or based on the historic or current data traffic associated with the STA. A STA that sends small data packets is allocated a short window by the AP. As illustrated in FIG. 1, the allocated opportunity window for the second STA is longer than the allocated opportunity window for the first STA. As explained previously, a very short IFS may be implemented in the opportunity window associated with a single or multiple STAs.

Referring now to FIG. 2, FIG. 2 illustrates an exemplary process flow for transmitting a data packet (e.g., a small data packet or a large data packet) from a first station to an access point on a network (e.g., a WLAN) or another station, in accordance with embodiments, of the invention. At step 210, the process flow comprises receiving, at a first station, a beacon from the access point or another station. In some embodiments, the beacon is received once during a DTIM interval. In some embodiments, the beacon comprises a sequence indicator (e.g., a sequence number). At step 220, the process flow comprises receiving, at the first station, information associated with an opportunity window from the access point or another station. In some embodiments, a duration of the opportunity window is based on a size of the data packet. At step 230, the process flow comprises transmitting, during the opportunity window, a data packet from the first station to the access point or another station. The data packet is transmitted on a RF channel. The opportunity window is associated with an interframe spacing (IFS) parameter (e.g., an IFS duration, a type of IFS, etc.). In some embodiments, the process flow further comprises at least one of requesting the opportunity window from the access point or informing the access point that the first station no longer needs the opportunity window. The opportunity window may be used by the first station to transmit a data packet to an access point or another station.

As explained above, any device, element, feature, method or process described anywhere in this specification with respect to an access point ("AP") may be associated with or performed by another station (e.g., a station other than the first station). For example, where the specification describes a transmission between an STA and the AP, such description would also be equally applicable to (and is intended to describe) a transmission between a first STA and a second STA also in the same context and using the same method and process. Thus, anywhere an AP is referenced, such reference may be replaced with a second STA (or "another STA" or "another station") throughout this specification.

In some embodiments, a second station does not receive information associated with the opportunity window of the first station. In other embodiments, a second station receives information associated with the opportunity window of the first station, and the second station does not send a data packet to the access point or another station during the opportunity window of the first station. In some embodiments, the process flow further comprises transmitting, during the same opportunity window, a second data packet from a second station to the access point or another station. In some embodiments, the process flow further comprises prior to transmitting during the opportunity window, determining if a second station is transmitting a second data packet to the access point or another station. In some embodiments, the access point or another station allocates at least one opportunity window after a specific number of beacons.

The invention is not limited to any particular types of systems or devices that can take the form of the AP and/or the STA. As used herein, a device may also be referred to as a system or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable or non-portable computing or non-computing devices such as servers or routers.

Referring now to FIG. 3, FIG. 3 presents an exemplary block diagram of the network environment for transmitting data packets to an access point or another station from a station connected to the access point or another station, in accordance with embodiments of the present invention. As illustrated, the network environment includes a network 310, an AP or another STA 330, and a STA 340. As shown in FIG. 3, the AP or another STA 330 and the STA 340 are each operatively and selectively connected (e.g., via one or more wired or wireless mechanisms) to the network 310, which may include one or more separate networks.

Each of the AP or another STA 330 and the STA 340 is a computing device that comprises a communication interface, a processor, a memory, and a module stored in the memory, executable by the processor, and configured to perform the various processes described herein. Each communication interface described herein enables communication with other systems via the network 310.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system (e.g., first device or second device) in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for transmitting a data packet from a first station to an access point or another station, the method comprising:
   receiving, at a first station, a beacon from the access point or another station;
   receiving, at the first station, information associated with an opportunity window from the access point or another station; and
   transmitting, during the opportunity window, a data packet from the first station to the access point or another station,
   wherein the information includes (i) an opportunity window initiation time that is offset in relation to a time of transmission of the beacon from the access point or the other station, and (ii) a duration of the opportunity window, and wherein the opportunity window initiation time and the duration are selected by the access point or the other station based on at least one of (1) the access point or the other station monitoring a current size of the data packet being received from the first station, and (2) the access point or other station determining a historical size of data packets previously transmitted by the first station.

2. The method of claim 1, wherein the data packet comprises a small data packet, and wherein a small data packet has a size less than 1500 bytes.

3. The method of claim 1, wherein the data packet comprises a large data packet, and wherein a large data packet has a size equal to or greater than 1500 bytes.

4. The method of claim 1, wherein the data packet is transmitted over a communications network comprising a wireless local area network.

5. The method of claim 1, wherein the beacon is received once during a delivery traffic indication message (DTIM) interval.

6. The method of claim 1, wherein the data packet is transmitted on a radio frequency (RF) channel.

7. The method of claim 1, wherein the opportunity window is associated with an interframe spacing (IFS) parameter.

8. The method of claim 1, wherein a second station does not receive the information associated with the opportunity window of the first station.

9. The method of claim 1, further comprising receiving, at a second station, the information associated with the opportunity window of the first station, and wherein the second station does not send a data packet to the access point or another station during the opportunity window of the first station.

10. The method of claim 1, further comprising requesting the information associated with the opportunity window from the access point or another station or informing the access point or another station that the first station no longer needs the information associated with the opportunity window.

11. The method of claim 1, further comprising transmitting, during the opportunity window, a second data packet from a second station to the access point or another station.

12. The method of claim 1, further comprising prior to transmitting during the opportunity window, determining if a second station is transmitting a second data packet to the access point or another station.

13. The method of claim 1, wherein the access point or another station allocates at least one opportunity window after a specific number of beacons.

14. The method of claim 1, wherein the beacon comprises a sequence indicator.

15. A first station for transmitting a data packet from a first station to an access point or another station, the first station comprising:
   a memory;
   a processor;
   a module stored in the memory, executable by the processor, and configured to:
      receive, at a first station, a beacon from the access point or another station;
      receive, at the first station, information associated with an opportunity window from the access point or another station; and
      transmit, during the opportunity window, a data packet from the first station to the access point or another station,
   wherein the information includes (i) an opportunity window initiation time that is offset in relation to a time of transmission of the beacon from the access point or the other station, and (ii) a duration of the opportunity window, and wherein the opportunity window initiation time and the duration are selected by the access point or the other station based on at least one (1) the access point or the other station monitoring a current size of the data packet being received from the first station, and (2) the access point or other station determining a historical size of data packets previously transmitted by the first station.

16. A computer program product for transmitting a data packet from a first station to an access point or another station, the computer program product comprising a non-transitory computer-readable medium comprising code configured to:
   receive, at a first station, a beacon from the access point or another station;
   receive, at the first station, information associated with an opportunity window from the access point or another station; and
   transmit, during the opportunity window, a data packet from the first station to the access point or another station,
   wherein the information includes (i) an opportunity window initiation time that is offset in relation to a time of transmission of the beacon from the access point or the other station, and (ii) a duration of the opportunity window, and wherein the opportunity window initiation time and the duration are selected by the access point or the other station based on at least one (1) the access point or the other station monitoring a current size of the data packet being received from the first station, and (2) the access point or other station determining a historical size of data packets previously transmitted by the first station.

* * * * *